(12) United States Patent
Yang et al.

(10) Patent No.: US 8,176,526 B1
(45) Date of Patent: May 8, 2012

(54) CONFIGURABLE REDUNDANT SECURITY DEVICE FAILOVER

(75) Inventors: Xiaosong Yang, Palo Alto, CA (US);
Lin Chen, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 998 days.

(21) Appl. No.: 11/561,710

(22) Filed: Nov. 20, 2006

Related U.S. Application Data

(60) Provisional application No. 60/848,163, filed on Sep. 29, 2006.

(51) Int. Cl.
*G06F 17/00* (2006.01)
(52) U.S. Cl. .............................. 726/1; 726/2
(58) Field of Classification Search ............. 726/1, 2
See application file for complete search history.

(56) References Cited

U.S. PATENT DOCUMENTS 7,328,261 B2 * 2/2008 Husain et al. ............ 709/224

* cited by examiner

*Primary Examiner* — Jacob Lipman
(74) *Attorney, Agent, or Firm* — Shumaker & Sieffert, P.A.

(57) ABSTRACT

Techniques are described for managing failover in redundant network devices. In particular, each device in a set of redundant network devices includes redundant processing modules. Each module provides a separate operating environment for a set of network services. Each network device includes a control unit that receives configuration information that specifies individual weight values for each of the modules and a threshold value for the network device. The control unit detects failures of the modules and transfers primary responsibility for performing the network service to a second network device when the threshold value is exceeded by a weighted sum of the weight values for the failed modules.

18 Claims, 4 Drawing Sheets

CONFIGURABLE REDUNDANT SECURITY DEVICE FAILOVER

This application claims the benefit of U.S. Provisional Application No. 60/848,163, filed Sep. 29, 2006, the entire content of which is incorporated herein by reference.

TECHNICAL FIELD

The invention relates to computer networks, and particularly to computer network security devices.

BACKGROUND

Due to increasing reliance on network-accessible computers, network security has become a major issue for organizations and individuals. To help ensure the security of their computers, organizations and individuals frequently install security devices between public networks and their private networks. A goal of such security devices is to prevent unwanted or malicious information from the public network from affecting devices in the private network.

Unfortunately, network security devices, like other devices, may fail. For example, a software or hardware problem or a power fault within a security device may cause all or a portion of the security device to stop functioning. When a security device fails, all network traffic flowing between the public network and the private network may cease. For an enterprise that depends on such network traffic this may be unacceptable, even if this failure occurs only for a short time. To minimize the chance of a failure causing all network traffic to cease, a backup security device may be installed. Thus, if the security device that has primary responsibility for performing the security services (i.e., the master security device) fails, the backup security device may be quickly substituted for the master security device. In other words, the failing security device "fails over" to the backup security device. After failing over to the backup security device, the backup security device becomes the master security device.

The process of failing over from a master to a backup security device may be computationally expensive and may cause significant delays. One reason for this is because, after failover, the backup security device is often required to reestablish network sessions with large numbers of client devices in the public and private networks. Because of the computational complexity of cryptography, these delays may be made worse if the backup security device must reestablish secure network sessions.

SUMMARY

In general, the invention is directed to techniques of managing failover in redundant network devices. The techniques allow an administrator to define fine-grained failover conditions tailored to the needs of the network and the particular characteristics of the network devices. For example, each of the network device may includes a plurality of redundant modules that provide separate operating environments for performing network services, such as virus detection or intrusion detection and prevention. An administrator may define a respective failover condition for each of the network devices, where the failover condition is a function of potential failures of the individual modules in the respective network device. If the failover condition for one of the network devices is triggered, the network device may transfer primary responsibility for performing the network service (i.e., fail over) to another one of the network devices.

In a basic example, a first network device may include removable modules that provide operating environments for the performance of a network security service on network traffic. For instance, each of the modules may perform the network security service at a specific rate of throughput. The performance of the network security service may be load balanced among the modules to increase overall throughput of the network device. A user may provide a failover condition for the first network device by associating a separate weight with each individual one of the security modules and by defining a threshold for the network device. If one of the modules fails, the network device adds the weight associated with the failed module to a weighted sum. The network device may then compare the weighted sum to the threshold. If the weighted sum meets or exceeds the threshold, the network device may fail over to another network device. By selecting appropriate weights and an appropriate threshold, the user may define a minimum tolerable overall throughput for the particular network device before failover is triggered.

In one embodiment, a method comprises receiving configuration information with a network device from a user. The network device includes a plurality of modules, each of which provides an operating environment for performing a network service on network traffic. The configuration information specifies individual weight values for each of the modules and a threshold value for the network device. In addition, the method includes detecting a failure of one of the modules. The method also comprises transferring primary responsibility for performing the network service to a second network device when the threshold value is exceeded by a weighted sum of the weight values for the failed modules.

In another embodiment, a network device is a first network device. The first network device comprises a plurality of modules. Each of the modules provide an operating environment for performing a network service on network traffic. The network device also comprises a control unit that receives configuration information that specifies individual weight values for each of the modules and a threshold value for the network device. The control unit detects failures of the modules and transfers primary responsibility for performing the network service to a second network device when the threshold value is exceeded by a weighted sum of the weight values for the failed modules.

In another embodiment, a computer-readable medium comprises instructions. The instructions cause a programmable processor of a network device to receive configuration information with the network device from a user. The network device includes a plurality of modules, each of which provides an operating environment for performing a network service on network traffic. The configuration information specifies individual weight values for each of the modules and a threshold value for the network device. The instructions also cause the processor to detect a failure of one of the modules. Furthermore, the instructions cause the processor to transfer primary responsibility for performing the network service to a second network device when the threshold value is exceeded by a weighted sum of the weight values for the failed modules.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
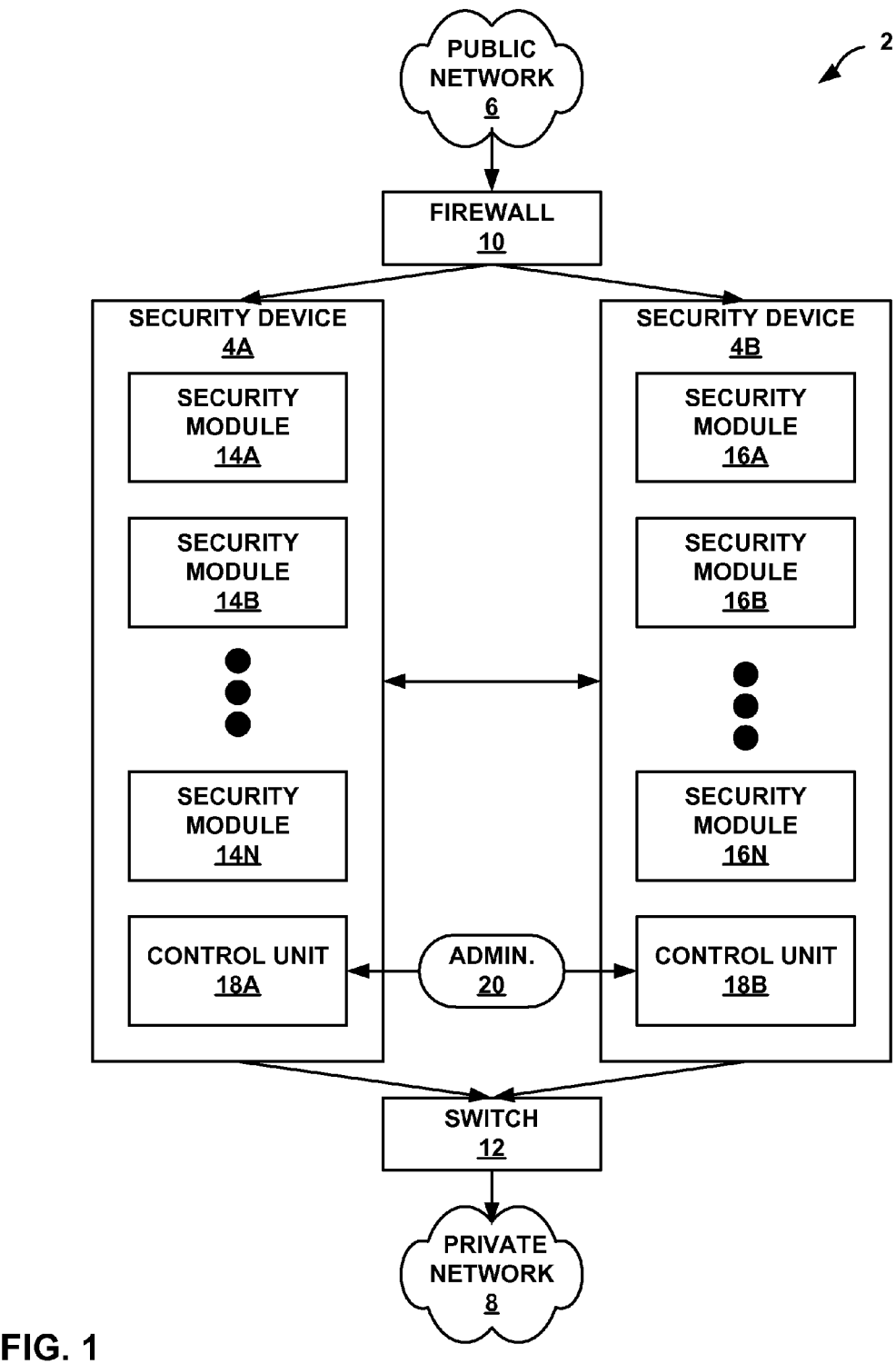
FIG. 1 is a block diagram illustrating an exemplary system in which security devices provide network security between a public network and a private network.

FIG. 1 is a block diagram illustrating an exemplary system 2 in which security devices 4A and 4B (collectively, security devices 4) provide network security between a public network 6 and a private network 8. In system 2, public network 6 may be any unsecured network, such as the Internet. Private network 8 may be a Local Area Network ("LAN"), such as a network used in a home or enterprise, or otherwise.

In order to reach devices on private network 8, network traffic from public network 6 travels through a firewall 10. Firewall 10 provides the network traffic from public network 6 to either or both of security devices 4. Security devices 4 constitute a set of redundant network devices, each of which is capable of performing at least one of a set of security services on the network traffic. For example, security devices 4 may be intrusion detection and prevention (IDP) devices that monitors traffic flowing between firewall 10 and internal computing nodes of private network 8.

When the network traffic from public network 6 reaches security devices 4, the one of security device 4 initially designated by administrator 20 as having primary responsibility for performing network security services (i.e., the "master device") applies the network security services to the network traffic. After applying the network security services, if the master device approves the network traffic, the master device may forward the network traffic to private network 8 via a switch 12.

Each of security devices 4 includes one or more security modules. As illustrated in the example of FIG. 1, security device 4A includes security modules 14A through 14N (collectively, security modules 14). Security device 4B includes security module 16A through 16N (collectively, security modules 16). In one embodiment, security modules 14 and 16 are individually removable physical line cards that may be plugged into motherboards or backplanes of security devices 4. Each of security modules 14 and 16 provide an operating environment for performing the network security services on network traffic. For example, security modules 14 and 16 may provide firewall services, intrusion detection services, virtual private network ("VPN") services, Internet Protocol Security ("IPSec") services, user authentication services, attack detection and prevention services, and so on.

In addition to security modules 14 and 16, each of security devices 4 includes a respective control unit. As illustrated in the example of FIG. 1, security device 4A includes control unit 18A and security device 4B includes control unit 18B. Control units 18A and 18B may load balance network traffic across security modules 14 and 16, respectively. In addition, as described herein, control units 18A and 18B provide failover logic by which an administrator 20 may easily define parameters to control the failover between security devices 4A and 4B.

For example, in many cases, each of security modules 14 and 16 may fail independently of each other and of the security device in which they reside. For example, in the case where each of security modules 14 are separate line cards, security module 14A may fail without necessarily causing security modules 14B through 14N to fail. Moreover, since each line card provides an operating environment for performing the security services, failure of security module 14A does not compromise private network 8 and does not necessarily render security device 4A inoperable. In other words, security device 4A and security modules 14B through 14N may continue functioning so as to provide the full suite of network security services even though security module 14A has failed. Because each of security modules 14 and 16 may be physically removable hardware units, an administrator may replace or repair an individual one of security modules 14 and 16.

As described herein, control units 18A and 18B present user interfaces that allow administrator 20 to flexibly define failover conditions for security devices 4A and 4B. The failover condition for a security device is a function of user-defined effects of potential failures of individual security modules in the security device. For example, to define failover conditions for security devices 4A and 4B, administrator 20 may associate a "weight" with each of security modules 14 and 16 on security device 4A and 4B, respectively. In one example, a weight may be any number greater than zero. Administrator 20 does not need to associate the same weight with a similar security module on security devices 4A and 4B. For example, administrator 20 may associate a weight of "2" with security module 14A and a weight of "5" with security module 16A, even if security modules 14A and 16A may provide environments for performing the same security services. Administrator 20 may choose to associate specific weights with specific ones of security modules 14 and 16 for a variety of reasons. For instance, security module 14A may provide twice as much throughput as security module 14B, and failure of security module 14A may therefore have a greater impact on overall throughput than failure of security device 14B. Alternatively, administrator 20 may associate a greater weight to security module 14A than to security module 14B because administrator 20 believes that the security service performed by security module 14A provides a higher-degree of security or is otherwise more important to the security of private network 8 than the security service provided by security module 14B.

In addition to associating a weight with each of the security modules, administrator 20 may also associate a "threshold" with each of security devices 4A and 4B that triggers a failover event for the respective security device. In one example, a threshold may be any number greater than zero. Furthermore, administrator 20 may associate different thresholds with each of security devices 4. For example, administrator 20 may associate a threshold of value "5" with security device 4A and a threshold of value "7" with security device 4B.

Each of control units 18A and 18B maintains a weighted sum indicative of the failed individual security components 14 and 16 within security devices 4A and 4B, respectively. When one of security modules 14 or 16 fails, the corresponding one of control units 18A or 18B adds the weight associated with the failed security module to the weighted sum for that security device. For instance, if security module 14A is associated with a weight of "4" and security module 14A fails, control unit 18A adds "4" to the current weighted sum for security device 4A. If security module 14B is associated with a weight of "6" and security module 14B fails after security module 14A fails, control unit 18A adds "6" to the existing "4" so that the new current weighted sum for security device 4A is "10". Control units 18A and 18B may determine that the failover conditions for security devices 4A and 4B have occurred when the respective weighted sums of the security devices meet or exceed the respective thresholds for the security devices.

Depending on the status of security devices 4, a security device may transfer primary responsibility for performing the network service to the other one of security devices 4 when the failover condition of the security device has occurred. For example, in one embodiment, control units 18A and 18B maintain a "status" for security devices 4A and 4B, respectively. In this embodiment, security devices 4 may have a status of "master", "backup", or "inoperative." Security devices 4A and 4B communicate and exchange information so as to select the appropriate status for each of the security devices. A given one of security devices 4 may not have more than one of these statuses. Moreover, if one of security devices 4 has the status of "master", the other one of security devices 4 cannot also have the status of "master." Similarly, if one of security devices 4 has the status of "backup", the other one of security device 4 cannot also have the status of "backup." However, both of security devices 4 may have the status of "inoperable."

For purposes of explanation, assume that security device 4A has a current status of "master" at the time when the weighted sum of security device 4A meets or exceeds the threshold of security device 4A. Because security device 4A has the status of "master", security device 4A has primary responsibility for performing security services on behalf of administrator 20. In this case, control unit 18A determines the status and weighted sum of security device 4B. To facilitate this determination, security devices 4 may periodically (e.g., once per second) exchange status and weighted sum indicators. If security device 4B has the status of "backup", security device 4A may fail over to security device 4B. Henceforth, security device 4B has the status of "master" while security device 4A has the status of "inoperable".

If security device 4B has the status of "inoperable", security device 4A compares its own weighted sum with the weighted sum of security device 4B. If the weighted sum of security device 4A is greater than or equal to the weighted sum of security device 4A, security device 4A assumes the status of "inoperable", but does not fail over to security device 4B. If the weighted sum of security device 4A is less than the weighted sum of security device 4B, security device 4A assumes the status of "inoperable" and fails over to security device 4B. In this case, security device 4B retains the status of "inoperable" but assumes primary responsibility for performing whatever security services it can provide.

If the weighted sum of security device 4A is equal to the weighted sum of security device 4B, security device 4A assumes the status of "inoperable" and consults a tie-break value. For instance, security device 4A may use an arbitrary identifier, such as an Internet Protocol address, of each of security devices 4 to act as a tie-break value. If the tie-break value of security device 4A is greater than or equal to the tie-break value of security device 4B, security device 4A does not fail over to security device 4B. On the other hand, if the tie-break value of security device 4A is less than the tie-break value of security device 4B, security device 4A fails over to security device 4B.

In some embodiments, system 2 may include more than two security devices. Thus, there could be two or more backup security devices. Administrator 20 may configure weights and thresholds on all of these security devices. The techniques described herein may be used to control which one of these backup security devices is selected if the master security device becomes inoperable. For instance, a master security device could fail over to the operable backup security device with the lowest weighted sum.

This invention may present one or more advantages. For example, the invention may allow an administrator to generate fine-grained failover conditions that are tailored to the needs of the administrator and the characteristics of the modules and the network devices. The ability to define fine-grained failover conditions may allow an enterprise to reduce or minimize the possibility that a security device will failover unnecessarily. Minimizing failover may prevent unnecessary and costly delays. Furthermore, by allowing some security modules to fail independently without requiring failover of the security device, this invention may allow the security device to continue supplying security services provided by the remaining security modules. This may further help in preventing network downtime.

Figure 2:
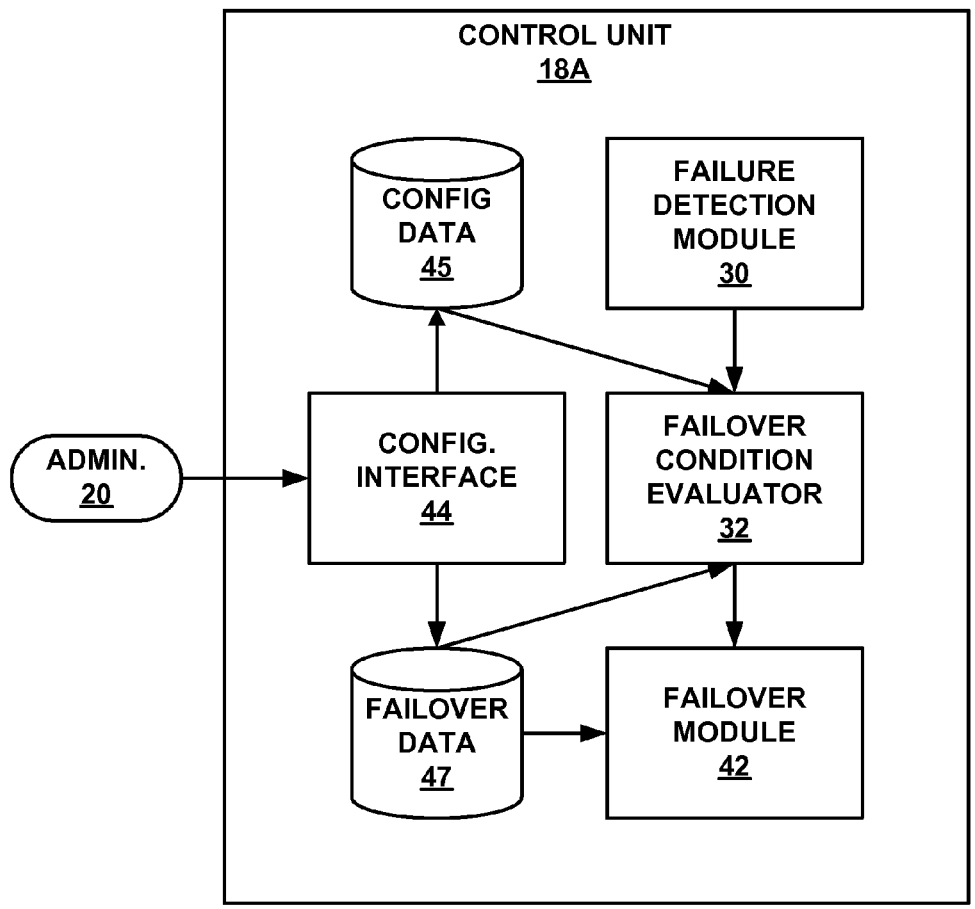
FIG. 2 is a block diagram illustrating an exemplary control unit within a security device.

FIG. 2 is a block diagram illustrating an exemplary control unit 18A within a security device 4A. While FIG. 2 is explained in terms of control unit 18A and security device 4A, it should be understood that control unit 18B and security device 4B may have a same or different embodiment.

As illustrated in the example of FIG. 2, control unit 18A may comprise several components. The components may be implemented as software, hardware, firmware or combinations thereof. As software, the components may be implemented in instructions executable by one or more programmable processors.

Control unit 18A may include a configuration interface 44 to provide a user interface to administrator 20 and to receive a definition of the failover condition of security device 4A via the user interface. For example, administrator 20 may use configuration interface 44 to associate weights with various ones of security modules 14 and to set a threshold for security device 4A. In the example of FIG. 2, a set of configuration data 45 stores the definition of the failover condition. For instance, configuration data 45 may store weights associated with security modules 14 and threshold for security device 4A. Configuration interface 44 may be a command line interface, a graphical user interface, or otherwise.

A failure detection module 30 detects failures in security modules 14. Failure detection module 30 may detect failures in security modules 14 by periodically monitoring (e.g., polling) each of security modules 14, upon receiving a failure communication from a security module, or by failing to receive a communication (e.g., a keepalive message) within a time period, or otherwise. For example, when failure detection module 30 detects a failure in one of security modules 14, failure detection module 30 may send an alert to a failover condition evaluator 32.

Failover condition evaluator 32 determines whether the failure of one or more of security modules 14 triggers a failover condition of security device 4A to occur. For example, when failover condition evaluator 32 receives an alert from failure detection module 30, failover condition evaluator 32 may add a weight in configuration data 45 associated with the failed security module to a current weighted sum for security device 4A in a set of failover data 47. After adding the weight of the failed security module to the weighted sum, failover condition evaluator 32 may compare the current weighted sum with a threshold value in configuration data 45. If the weighted sum meets or exceeds the threshold value, failover condition evaluator 32 sets a current status of security device 4A in failover data 47 to "inoperable" because the failover condition of security device 4A has occurred.

Control unit 18A may receive a network message conveying an indication of a weighted sum and current status from security device 4B. Security device 4B may issue the message periodically or in response to a status change. Failover data 47 may store the indication of the weighted sum and current status of security device 4B.

When failover condition evaluator 32 determines that the failover condition of security device 4A has occurred, a failover module 42 may take various actions depending on the current status of security device 4A and the current status of security device 4B. As one example, assuming that security device 4A has primary responsibility for performing the security services (i.e., has the status of "master"), failover module 42 may transfer primary responsibility for performing services to security device 4B when failover condition evaluator 32 determines that the failover condition of security device 4A has occurred and when security device 4B has the status of "backup".

As another example, failover module 42 may transfer primary responsibility when failover conditions both security devices 4A and 4B have occurred (i.e., when both devices have the status of "inoperable"). For example, failover module 42 may transfer primary responsibility from security device 4A to security device 4B when both security devices 4A and 4B have the status of "inoperable"), but failover data 47 indicates that the current weighted sum for security device 4B is less than weighted sum for security device 4A.

As yet another example, failover module 42 may transfer primary responsibility from security device 4A to security device 4B when failover conditions of both security devices 4A and 4B have occurred, the weighted sum of security device 4B is equal to the weighted sum of security device 4A, and a tie-break condition dictates that security device 4A should fail over to security device 4B. For example, the tie-break condition may be a simple selection of the lower Internet Protocol addresses for the devices. In failing over to security device 4B, failover module 42 may transfer network session information to security device 4B.

Figure 3:
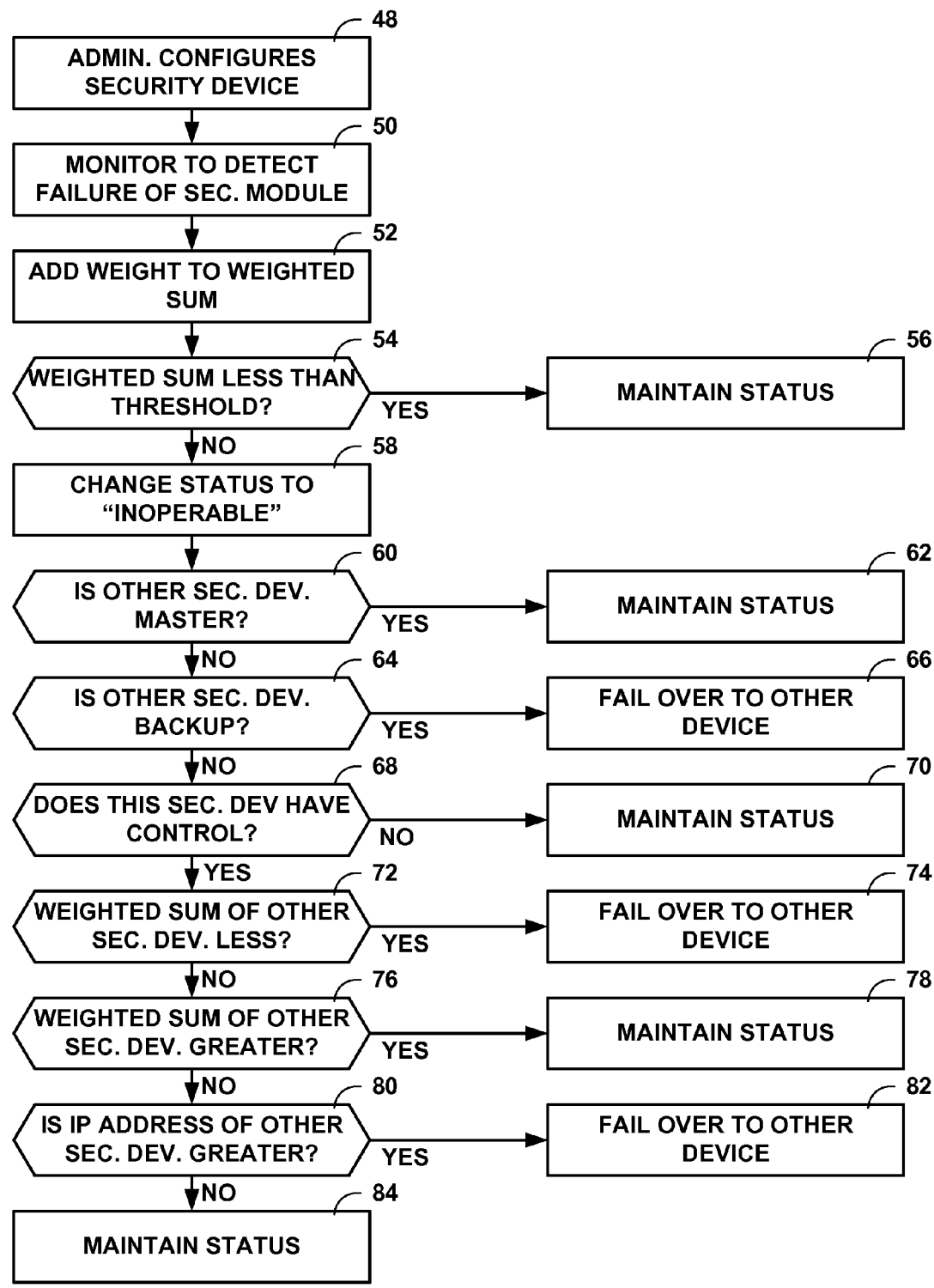
FIG. 3 is a flowchart illustrating an exemplary operation of a control unit within a security device.

FIG. 3 is a flowchart illustrating an exemplary operation of control unit 18A within a security device 4A. While FIG. 3 is explained in terms of control unit 18A and security device 4A, it should be understood that control unit 18B and security device 4B may perform the same or different operation. Moreover, the techniques may be applied to systems having two or more security devices.

Initially, administrator 20 or an automated agent configures security device 4A (48). For example, administrator 20 or the automated agent may input configuration data 45 (FIG. 2) to define weights for each of security modules 14, specify a failover threshold for security device 4A, and specify "master" or "backup" status for device 4A. Next, control unit 18A monitors security modules 14 and may eventually detect a failure of one of the security modules (50). As indicated above, control unit 18A may detect a failure of one of security modules 14 in a number of ways, including receiving a failure signal from one of security modules 14, polling security modules 14, failure to receive an alive signal from one of security modules 14, and so on. When control unit 18A detects a failure of one of security modules 14, control unit 18A adds the weight associated with the failed security module to the current weighted sum for security device 4A (52).

After adding the weight of the failed security module to the weighted sum of security device 4A, control unit 18A compares the weighted sum to the threshold value of security device 4A (54). If the weighted sum is less than the threshold value ("YES" of 54), control unit 18A maintains the current status of security device 4A, e.g., either "master" or "backup" (56). On the other hand, if the weighted sum is not less than (i.e., greater than or equal to) the threshold value ("NO" of 54), control unit 18A changes the status of security device 4A to "inoperable" (58).

Once control unit 18A changes the status of security device 4A to "inoperable", control unit 18A determines whether to fail over to security device 4B. For example, in one embodiment, control unit 18A determines whether security device 4B already has the status of "master" (60). If security device 4B has the status of "master" ("YES" of 60), control unit 18A maintains status and does not fail over to security device 4B (62). This is because if security device 4B has the status of "master", security device 4B is still operable, but security device 4A does not have primary responsibility of performing services on behalf of administrator 20.

If security device 4B does not have the status of "master" ("NO" of 60), control unit 18A determines whether security device 4B has the status of "backup" (64). If security device 4B has the status of "backup" ("YES" of 64), control unit 18A fails over to security device 4B (66). This is because if security device 4B has the status of "backup", security device 4B is still operable and because security device 4A has the primary responsibility of performing the network security services.

If security device 4B does not have the status of "backup" ("NO" of 64), security device 4B must have the status of "inoperable". This is because there are only three status states: "master", "backup", and "inoperable" and control unit 18A already determined that security device 4B does not have status states "master" or "backup". When security device 4B has the status of "inoperable", the action of control unit 18A depends on whether security device 4A had primary responsibility to perform services on behalf of administrator 20 (68). That is, whether security device 4A had the status of "master" prior to the weighted sum meeting or exceeding the threshold. If security device 4A does not have primary responsibility to perform services on behalf of administrator 20 ("NO" of 68), control unit 18A maintains the status of "inoperable" and does not fail over to security device 4B (70).

If security device 4A has control ("YES" of 68), control unit 18A determines whether the weighted sum of security device 4B is less than the weighted sum of security device 4A (72). If the weighted sum of security device 4B is less than the weighted sum of security device 4A ("YES" of 72), security device 4A fails over to security device 4B (74).

If the weighted sum of security device 4B is not less than (i.e., is greater than or equal to) the weighted sum of security device 4A, control unit 18A determines whether the weighted sum of security device 4B is greater than the weighted sum of security device 4A (76). If the weighted sum of security device 4B is greater than the weighted sum of security device 4A ("YES" of 76), control unit 18A maintains the status of "inoperable" and does not fail over to security device 4B (78).

If the weighted sum of security device 4B is not greater than (i.e., is equal to) the weighted sum of security device 4A ("NO" of 76), control unit 18A determines whether an IP address of security device 4B is greater than an IP address of security device 4A (80). The IP address may simply be a tie-break value to determine which one of security devices 4 should have control. If control unit 18A determines that the IP address of security device 4B is greater than the IP address of security device 4A, control unit 18A fails over to security device 4B (82). On the other hand, if the IP address of security device 4B is not greater than the IP address of security device 4A, control unit 18A maintains the status of "inoperable" and does not fail over to security device 4B (84).

Figure 4:
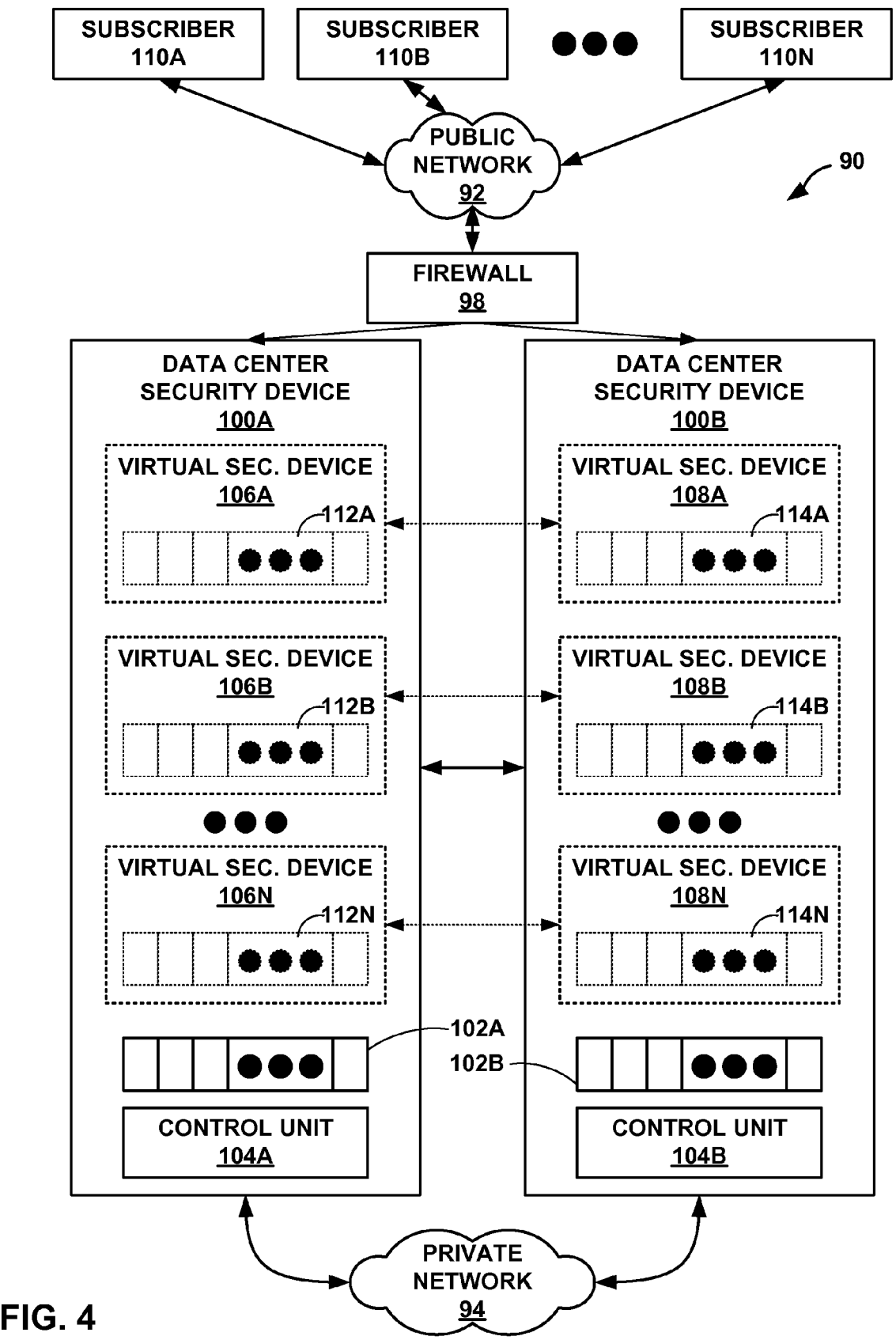
FIG. 4 is a block diagram illustrating an exemplary system in which security devices include virtual security devices to provide network security between a public network and a private network for a plurality of subscribers.

FIG. 4 is a block diagram illustrating an exemplary system 90 in which data center security devices include virtual security devices to provide network security between a public network and a private network for a plurality of subscribers. System 90 includes a first data center security device 100A and a second data center security device 100B. Collectively, data center security device 100A and data center security device 100B may be referred to herein as "data center security devices 100." In addition, system 90 includes a public network 92, a private network 94, and a firewall 96. Private network 92, like private network 8, may include one or more servers that provide network services to subscribers 110A through 110N (collectively, "subscribers 110"). Subscribers 110 may be businesses or individuals who contract with a data center that provides one or more resources to subscribers 110 on private network 94. Public network 94, like public network 6, may be any unsecured network, such as the Internet. Moreover, firewall 96, like firewall 10 may provide network traffic from public network 6 to either or both of data center security devices 100.

Data center security device 100A includes a set of modules 102A. Each of modules 102A represents a hardware or software unit of data center security device 100A that may be utilized by subscribers 110 and that may fail without causing the failure of data center security device 100A. For example, modules 102A may include security modules, memory modules, input/output drivers, storage media, network or bus connections, executing software applications, and so on. Modules 102A may apply one or more network services to network traffic arriving from public network 92 or private network 94. Data center security device 100B includes a set of modules 102B. Modules 102B include at least some of the modules in modules 102A. For example, modules 102A and modules 102B may include the same set of security modules.

Data center security devices 100A and 100B include control units 104A and 104B, respectively. Control unit 104A may present one of virtual security devices 104A through 104N to each of subscribers 110A through 110N. Similarly, control unit 104B may present one of virtual security devices 106A through 106N to each of subscribers 110A through 110N. Virtual security devices 106A through 106N (collectively, "virtual security devices 106") and virtual security devices 108A through 108N (collectively, "virtual security devices 108") are sets of subscriber-specific configuration parameters of data center security devices 100A and 100B, respectively. The configuration parameters for one of subscribers 110 may govern how data center security devices 100 apply network services to network traffic associated with the subscriber. When one of subscribers 110 sends a request to view configuration parameters of data center security devices 100, data center security devices 100 provide the subscriber with configuration parameters of the subscriber's one of virtual security devices 106 or 108. Because data center security devices 100 apply network services to network traffic associated with a subscriber in accordance with the configuration parameters specified by the subscriber and because data center security devices 100 only provide the subscriber with the subscriber's own set of configuration parameters, the subscriber may consider data center security devices 100 to operate for the subscriber's exclusive use. For example, control units 104 may present virtual security device 106A exclusively to subscriber 110A. From the perspective of subscriber 110A, the configuration parameters of virtual security device 104A are the only configuration parameters of data center security device 100A. However, at the same time, control unit 104A may present virtual security device 106B to subscriber 110B. From the perspective of subscriber 110B, the configuration parameters of virtual security device 108B are the only configuration parameters of security device 100B. This may be true in spite of the fact that the configuration parameters of virtual security device 108B may differ from the configuration parameters of virtual security device 108A.

Each of virtual security devices 106 includes a set of virtual modules 112A through 112N (collectively, "virtual modules 112"). Similarly, each of virtual security devices 108 includes a set of virtual modules 114A through 114N (collectively, "virtual modules 114"). Virtual modules 112 and 114 represent subscriber-specific sets of configuration parameters of modules 102. From the perspective of subscribers 110, configuration parameters of modules 102 presented to respective ones of subscribers 110 are the only configuration parameters of modules 102.

Control units 104 may receive configuration information from subscribers 110. The configuration information from subscribers 110 may independently specify the configuration parameters of their respective ones of virtual security devices 106 and 108 to define failover conditions for virtual security devices 106 and virtual security devices 108. For example, control units 104 may receive from each of subscribers 110 configuration information that specifies independently independent sets of weight values for each virtual module in their respective sets of virtual modules 112 and 114. Furthermore, each of subscribers 110 may independently associate a threshold with their respective one of virtual machines 106 and virtual machines 108. For example, subscriber 110A may associate the weight of "5" with one of virtual modules 112A representing configuration parameters for subscriber 110A of a first one of modules 102A. In addition, subscriber 110A may associate the threshold value "7" with virtual security device 106A. At the same time, subscriber 110B may associate the weight of "9" with one of virtual modules 112B representing the same first one of modules 102A. In addition, subscriber 110B may associate the threshold value of "6" with virtual security device 106B. For example, subscriber 110A may use the following command to make those settings:

SET HA vsd_id virtual_security_device__1 monitor security_module 82A weight 5 threshold 7

In this command, "HA" stands for "high availability" (i.e., redundancy).

When one of modules 102A or modules 102B fails, control units 104A or 104B, respectively, detect this failure and adds the weights associated by each of subscribers 110 in respective ones of virtual security devices 106 or 108 with the failed module to the weighted sums of each of virtual security devices 106 or 108. For example, suppose that subscriber 110A assigns the weight of "5" to one of virtual modules 112A representing a first one of modules 102A and subscriber 110B assigns the weight of "9" to one of virtual modules 112B representing the first one of modules 102A. If the first one of modules 102A fails, control unit 104A adds "5" to the weighted sum for virtual security device 106A and "9" to the weighted sum for virtual security device 106B.

After one of control units 104 adds a weight of a failed module to the weighted sums for each of virtual security devices 106 and 108, that control unit determines whether to fail over for each of virtual security devices 106 or 108. For example, after control unit 104A adds weights of a failed one of modules 102A to the weighted sums of each of virtual security devices 106, control unit 104A determines whether each of virtual security device 106 should fail over to a respective one of virtual security devices 108. That is, control unit 104A may apply the set of steps described in FIG. 3 for each of virtual security devices 106.

Because each of subscribers 110 may provide different weights and threshold values for respective ones of virtual security devices 106, control unit 104A may determine that some of virtual security devices 106 should fail over, but not others. Thus, data center security device 100A may retain primary responsibility for performing services on network traffic associated with subscriber 110A and transfer primary responsibility for performing services on network traffic associated with subscriber 110B to data center security device 100B.

Various embodiments of the invention have been described. These embodiments are not intended to be the exclusive embodiments of this invention. For example, these systems may not be limited to security devices and security modules. For instance, these systems may be storage devices with storage modules. These and other embodiments are within the scope of the following claims.

The invention claimed is:

1. A computer-implemented method comprising:
   receiving configuration information with a first network device from a first user, wherein the first network device includes a plurality of modules, each of which provides an operating environment for performing a network service on network traffic, and wherein the configuration information specifies individual weight values for each of the modules and a threshold value for the first network device;
   receiving configuration information with the first network device from a second user, wherein the configuration information from the second user specifies a second set of individual weight values for each of the modules and a second threshold value for the first network device;
   detecting a failure of one or more of the modules;
   transferring primary responsibility for performing the network service to a second network device when the threshold value is exceeded by a weighted sum of the weight values for the failed modules; and
   transferring primary responsibility for performing the network service on network traffic associated with the second user when the second threshold value is exceeded by a weighted sum of the second set of weight values for the failed modules.

2. The method of claim 1,
   wherein the method further comprises receiving configuration information with the second network device, wherein the second network device includes a plurality of modules, each of which provides an operating environment for performing the network service on network traffic, and wherein the configuration information specifies individual weight values for each of the modules and a threshold value for the second network device; and
   wherein transferring primary responsibility comprises transferring primary responsibility to the second device when the threshold value for the second network device is not exceeded by a weighted sum of the weight values for the failed modules on the second network device.

3. The method of claim 1, wherein one of the modules is a removable line card.

4. The method of claim 1, wherein the method further comprises load balancing performance of the network service across the modules.

5. The method of claim 1, wherein a specified individual weight value for a module is associated with a degree of security provided by a security service performed by the module.

6. The method of claim 1, wherein the weighted sum represents a sum of degrees of security provided by security services performed by the failed modules when the failed modules are functioning.

7. The method of claim 1, wherein the method further comprises:
   upon detecting the failure of the module, adding one of the weight values associated with the failed module to the weighted sum for the first network device; and
   comparing the weighted sum for the first network device with the threshold for the first network device.

8. The method of claim 7, wherein one of the weights is different than another one of the weights.

9. The method of claim 7, further comprising:
   upon determining that the failover condition has occurred, transferring primary responsibility for performing the network service to the second network device when: (1) the threshold value for the first network device is exceeded by the weighted sum of the first network device; (2) a threshold value of the second network device is exceeded by a weighted sum of the weight values for the failed modules on the second network device; and (3) the weighted sum of the second network device is less than the weighted sum of the first network device.

10. A network device,
    wherein the network device is a first network device; and
    wherein the network device comprises:
    a plurality of modules, wherein each of the modules provide an operating environment for performing a network service on network traffic; and
    a control unit that receives configuration information that specifies individual weight values for each of the modules and a threshold value for the network device,
    wherein the control unit detects failures of one of the modules and transfers primary responsibility for performing the network service to a second network device when the threshold value is exceeded by a weighted sum of the weight values for the failed modules,
    wherein the configuration interface receives configuration information from a second user,
    wherein the configuration information from the second user specifies a second set of individual weight values for each of the modules and a second threshold value for the network device, and
    wherein the failover module transfers primary responsibility for performing services performed on network traffic associated with the second user when the second threshold value is exceeded by a weighted sum of the second set of weight values for the failed modules.

11. The network device of claim 10,
    wherein the second network device comprises a plurality of modules, each of which provides an operating environment for performing the network service on network traffic, and wherein the second network device receives configuration information that specifies individual weight values for each of the modules of the second device and a threshold value for the second network device; and
    wherein the control unit of the first network device transfers primary responsibility when: (1) the threshold value for the first network device is exceeded by a weighted sum of the weight values for the failed modules of the first network device, and (2) the threshold value for the second network device is not exceeded by a weighted sum of the weight values for the failed modules on the second network device.

12. The network device of claim 10, wherein one of the modules is a removable line card.

13. The network device of claim 10, wherein the first network device load balances performance of the network service across the modules.

14. The network device of claim 10, wherein, upon detecting the failure of the module, the failover condition evaluator adds one of the weight values associated with the failed module to the weighted sum for the first network device, and then compares the weighted sum for the network device with the threshold for the first network device.

15. The network device of claim 14, wherein one of the weights is different than another one of the weights.

16. The network device of claim 14, wherein a failover module transfers primary responsibility for performing the network service to the second network device when the following conditions occur: (1) the threshold value is exceeded by the weighted sum of the first network device; (2) a threshold value of the second network device is exceeded by a weighted sum of the second network device; and (3) the weighted sum of the second network device is less than the weighted sum of the first network device.

17. A computer-readable medium comprising instructions, the instructions causing one or more programmable processors of a first network device to:

receive configuration information with the first network device for a user, wherein the first network device performs security services on network traffic and includes a plurality of modules, each of which provides an operating environment for performing a different security service on network traffic, wherein the configuration information specifies individual weight values for each of the modules and a threshold value for the first network device;

detect a failure of one or more of the modules; and transfer primary responsibility for performing the security services to a second network device when the threshold value is exceeded by a weighted sum of the weight values for the failed modules on the first network device.

18. The computer-readable medium of claim 17, wherein the instruction that cause the processors to determine whether a failure causes a failover condition comprise instructions that cause the processor to:

upon detecting the failure of the module, add one of the weight values associated with the failed module to the weighted sum; and compare the weighted sum for the first network device with the threshold for the first network device.

\* \* \* \* \*